March 23, 1926.　　　　　　　　　　　　　　　　　　　　　1,577,743
P. T. GOSSETT
BUCKING AUTOMOBILE
Filed Nov. 26, 1923　　　2 Sheets-Sheet 1

INVENTOR.
PURK T. GOSSETT.
BY
ATTORNEYS.

March 23, 1926.
P. T. GOSSETT
BUCKING AUTOMOBILE
Filed Nov. 26, 1923   2 Sheets-Sheet 2
1,577,743
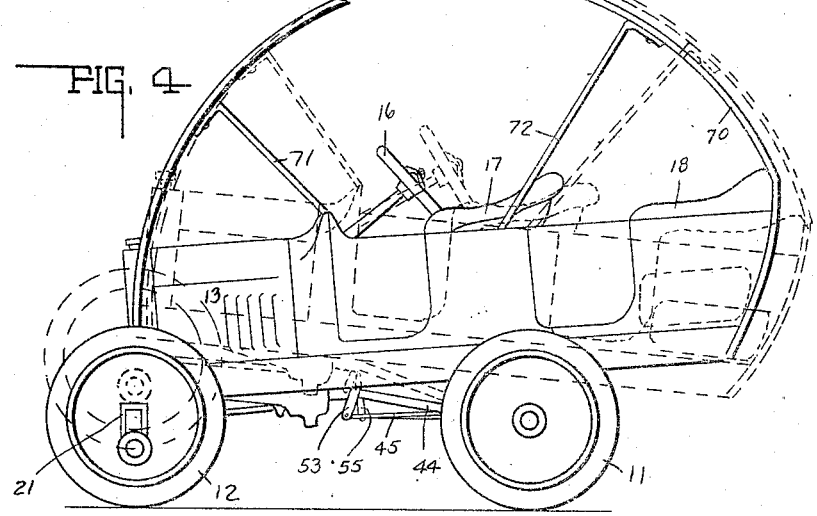
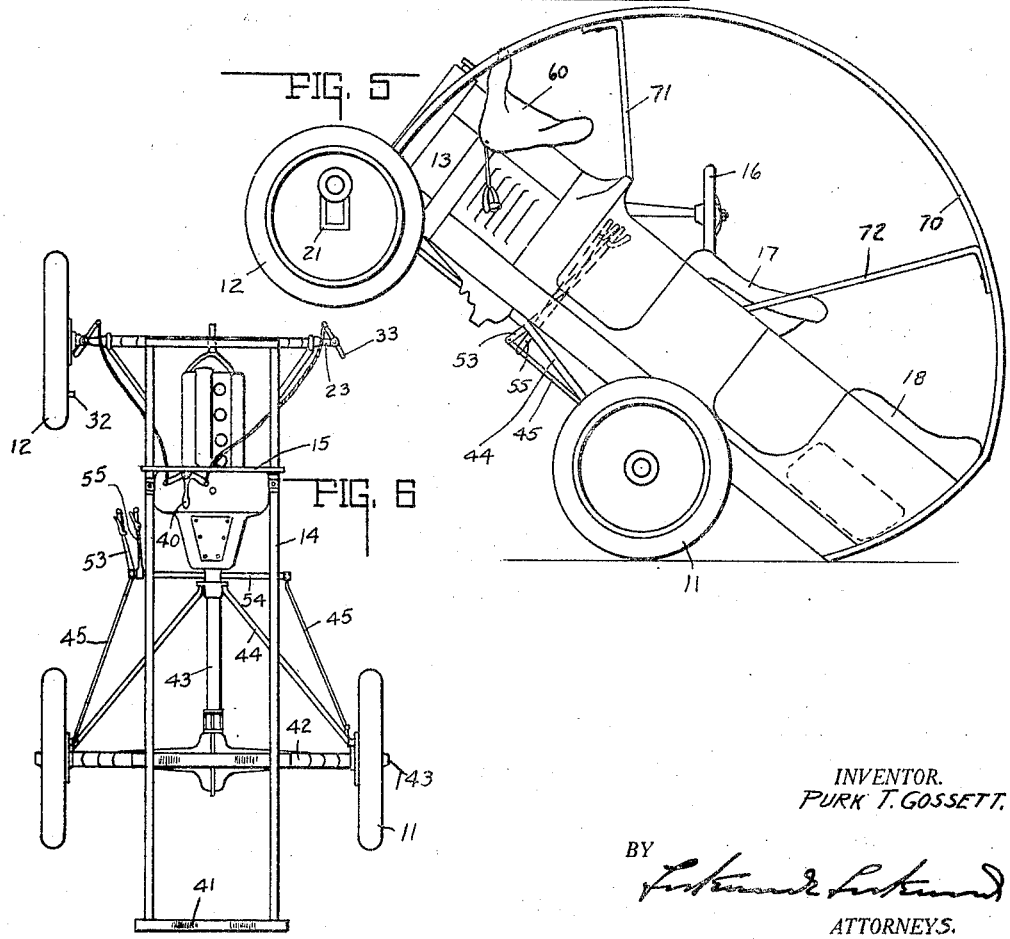
INVENTOR.
PURK T. GOSSETT.
BY
ATTORNEYS.

Patented Mar. 23, 1926.

1,577,743

UNITED STATES PATENT OFFICE.

PURK T. GOSSETT, OF FRANKFORT, INDIANA, ASSIGNOR TO ALONZO P. GREEN AND ROBERT J. MORAN, BOTH OF ATTICA, INDIANA.

BUCKING AUTOMOBILE.

Application filed November 26, 1923. Serial No. 677,065.

*To all whom it may concern:*

Be it known that I, PURK T. GOSSETT, a citizen of the United States, and a resident of Frankfort, county of Clinton, and State of Indiana, have invented a certain new and useful Bucking Automobile; and I do hereby declare that the following is a full, clear, and exact description thereof, reference being had to the accompanying drawings, in which like numerals refer to like parts.

The object of this invention is to arrange an automobile for bucking and adapt it for many trick plays for use in entertainments and exhibitions.

One novel feature consists in mounting the front wheels so they can be centered or decentered when desired and be decentered quickly from the driver's seat. When decentered the automobile is given a longitudinal rocking movement like a small ship riding waves. In this connection there is means for independently decentering the front wheels so that either front wheel can be decentered which will cause the automobile to limp.

Another novel feature consists in locating the rear axle of the automobile close to the center of gravity thereof so that the automobile may be easily tilted longitudinally when desired or caused to buck or rear, until the rear end of the body of the automobile rests on the ground. Cooperating with this feature of the invention is the provision of a counterbalancing weight in the rear end of the body of the automobile and also the decentering of the front wheels so they will throw the front end of the automobile upward and will help in the tilting movement of the automobile.

Another feature of the invention consists in combining with the means for causing the automobile to buck or rear, of means for setting the brake on either of the rear wheels so as to cause the automobile to wobble or turn when reared. To this end independent means for braking each rear wheel is provided.

Another novel feature is the provision of longitudinal upwardly bowed guards for enabling the automobile to turn over partially or wholly longitudinally, as in a somersault.

Another novel feature is fastening a saddle on the hook for a broncho rider while the automobile is bucking.

Figure 1:
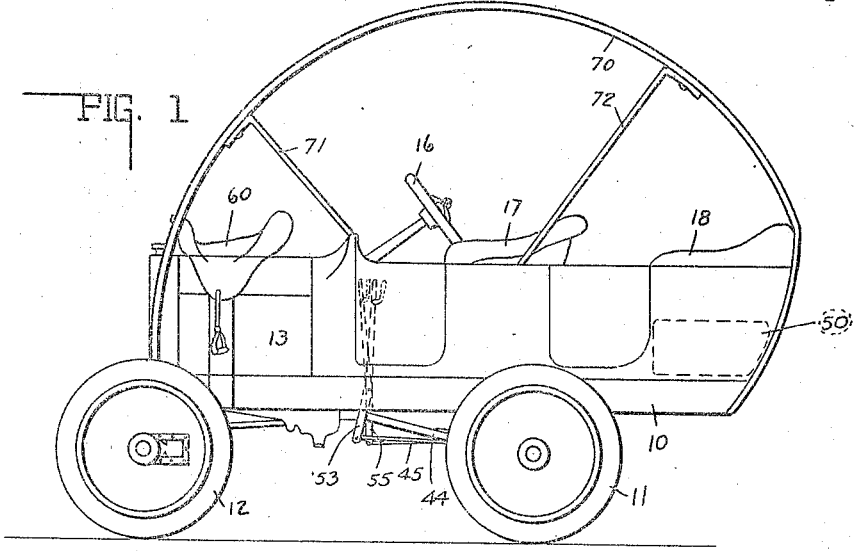
Figure 2:
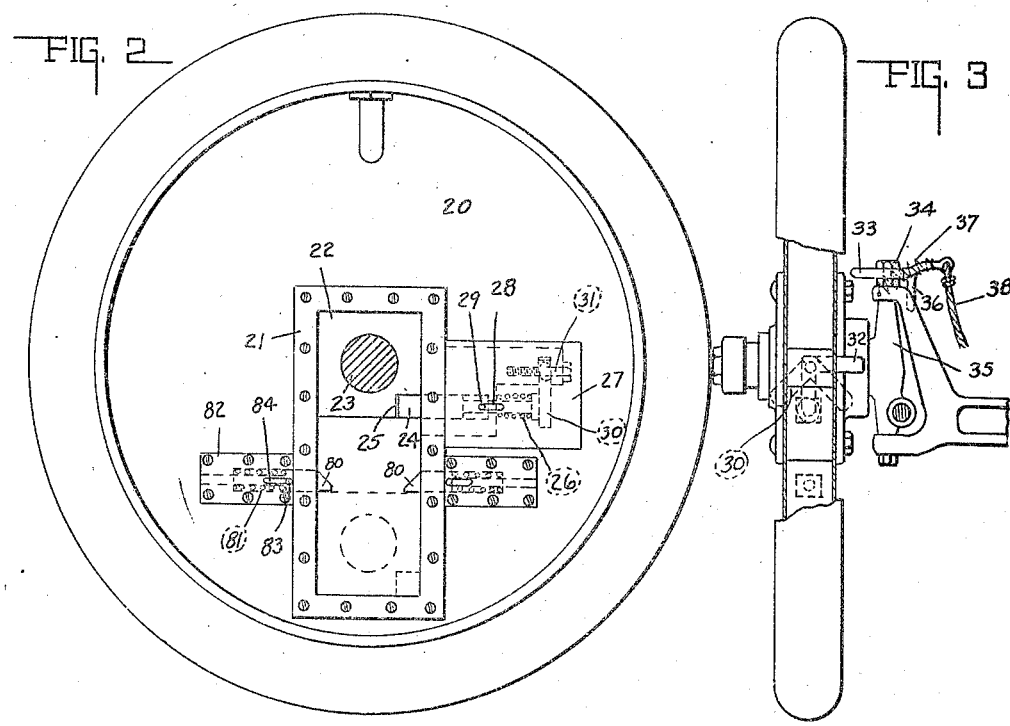
Figure 3:
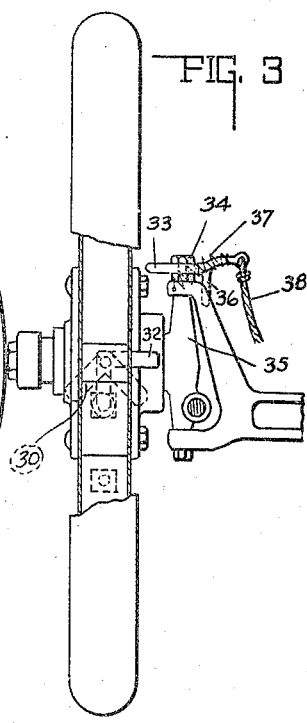

The full nature of the invention will be understood from the accompanying drawings and the following description and claims:

In the drawings, Figure 1 is a side elevation of the automobile in normal travelling condition. Fig. 2 is an enlarged side elevation of a front wheel, showing parts in section and parts in dotted lines. Fig. 3 is an end elevation of said wheel and an end of the front axle, parts being broken away and parts being shown in dotted lines. Fig. 4 is a side elevation of the automobile with the front wheels decentered and with the front of the automobile in its lowest position and the position of the parts when the front of the automobile is in its highest position, as shown by dotted lines. Fig. 5 is a side elevation of the automobile while bucking. Fig. 6 is a plan view of the frame and running gears of the automobile excepting the right front wheel.

These tricks are usually performed with a Ford automobile, and, therefore, there is shown herein a two-seated Ford automobile of common type having a body 10, rear wheels 11, front wheels 12, hood 13, frame 14, dash 15, steering wheel 16, front seat 17 and rear seat 18.

The front wheels are modified so that they may be decentered for giving the automobile a longitudinal rocking movement. The wheel is of the metal disk type having metal disks 20 in which there is a guide frame 21 secured for holding and guiding an axle block 22 carrying the front axle 23 of the automobile.

The guide frame 21 extends radially and is so located that when the bearing block is in the inner end of the guideway, as seen in Fig. 3, the axle will be in the center of the wheel, and it is held in that position by a plunger 24 projecting through one side of the guide frame 21 into a notch 25 of the axle block 22. While the parts are in this position the automobile travels normally.

When it is desired to decenter the front wheels, the plunger 24 is withdrawn by a spring 26 coiled about a reduced end portion of the plunger 24 operating in a casing 27, mounted between the disks 20, and having longitudinal slots 28 through which a pin 29 from the plunger extends and which limits the movements of the plunger. The plunger 24 is held in locking position and the spring 26 compressed, as shown in Fig. 2, by the lower arm 30 of a bell crank lever which is fulcrumed on a fulcrum screw 31 in the frame 27 and the other arm 32 of the bell crank lever extends laterally and inwardly from the wheel, as shown in Fig. 3, in position to disengage the outer end of a trip bar 33, which is fulcrumed horizontally at 34 to the knuckle 35, as shown in Fig. 3, and has a downwardly-extending stop lug 36.

The trip bar 33 is normally held out of engagement with the arm 32 of the bell crank lever by a spring 37 and it is moved into transverse or engaging position by a cord 38 that extends back through the dash 15 and is connected with one arm of a bell crank handle lever 40 mounted on the dash by a ball and socket joint, as seen in Fig. 6. If the handle 40 is thrown to the right, it will decenter the left-hand wheel, which enables the car to limp on that side. By throwing the handle 40 to the left, it will limp on the other side. By throwing the handle 40 downward, both front wheels will be decentered simultaneously.

When the spring 26 is released and the plunger 24 withdrawn thereby from the locking position with the axle block 22 and the front wheels are turning and have assumed the position shown in Fig. 2, the weight of the front end of the automobile will force the axle 23 and axle block 22 down into the lower end of the guide frame 21, as shown in Fig. 2, by dotted lines, and as the axle block 22 makes its downward movement, it crowds laterally out of the way the two locking pawls 80 that extend through the guiding frame 21. The ends of the locking pawls are beveled on the upper side and are spring pressed inwardly by the springs 81 in the frame 82 and the movements of the pawls are limited by the pins 83 in them that extend into the slots 84 in the side of the frame 82. As soon as the bearing block 22 reaches its lower position, the spring pawls 80 are forced inward by the springs 81 into the position shown in Fig. 2, which locks the axle block 22 in the decentered position.

As the Ford automobile is built and sold, the rear axle and spring are mounted under the bar 41 at the rear end of the frame, as seen in Fig. 6. In this bucking Ford construction the rear spring 42 and axle 143 are moved forward about thirty inches, as shown in Fig. 6. The driving shaft 43, radius rods 44 and brake rods 45 are correspondingly shortened. The purpose of this change of construction is to bring the rear axle near the center of gravity of the automobile. However, a counterweight 50 is placed beneath the rear seat 18 in the body, having a weight of about 350 pounds. With these two changes in the construction, the automobile can be unbalanced and caused to tilt or rear. If the rear axle is moved further forward, less counterweight 50 is required.

The brake rod 45 on the left-hand side of the automobile is operated by a lever 53 while the brake rod 45 on the right-hand side of the automobile is operated by a tube 54 and lever 55. In other words, the construction is such that the driver can brake either rear wheel. A rough rider's saddle 60 is mounted on the hood, as shown.

In operating this automobile usually two or three persons occupy the rear seat and are dressed like some country people and they add counterweight to the rear of the automobile. Also a rough rider occupies the saddle 60 and a couple of people in the driver's seat 17. In the beginning of the exhibition the driver operates the automobile normally; then by throwing the lever 40 in one direction, he can decenter one of the front wheels and cause the automobile to limp; or by depressing the lever 40 he can decenter both front wheels and cause the automobile to rock violently. By giving the engine a sudden impulse he can throw the automobile up into rearing position, the decentered front wheels contributing greatly to this accomplishment, sudden operation of the engine and transmission takes place while the front end of the automobile is being elevated by the decentered front wheels. While the automobile is in rearing position, as shown in Fig. 5, the driver can set the brake on first one rear wheel and then the other and cause the automobile to turn around this way and that and cut various capers. In the rearing position the automobile body touches the ground at the rear, as shown in Fig. 5, which ordinarily prevents the automobile from turning backwards.

An additional feature is added when desired for enabling the automobile to turn over backwards. This consists in a pair of curved bars 70 bowed upward and extending from the front to the rear of the body and one at each side of the body and suitably braced by the front and rear braces 71 and 72 extending to the sides of the body. This overturning frame may be omitted when not desired.

The rearward overturning movement is accomplished by a very strong and violent bucking movement causing the front end of the automobile to go upward from the horizontal position to the bucking position, and occupants of the automobile cooperate with the weight of the automobile in accomplishing this movement. During such rear overturning movement, the automobile body is prevented from crushing the occupants by the overturning frame described.

The invention claimed is:

1. A bucking automobile including the combination with the front axle and front wheels, of means for mounting the axle in the wheels that is movable outwardly from the center of each wheel for decentering the wheel, releasable means mounted in each wheel for locking the axle-mounting means in a central position, and means mounted in each wheel for locking the axle mounting means in a decentered position.

2. A bucking automobile including the combination with the front axle, front wheels and driver's seat, of an axle block mounted in each wheel so as to be outwardly movable from the center of each wheel, releasable means mounted in each wheel for holding the axle block at the center of the wheel, and means mounted in each wheel for automatically locking the axle block when in decentered position and means operable near the driver's seat for releasing said means for holding the axle block at the center of the wheel.

3. A bucking automobile including the combination with the front axle and front wheels, of a radially-extending guide frame on each wheel, an axle block slidable therein so that in the inner position the wheel will be centered, releasable means extending into said frame for holding the axle block in center position, and yielding locking pawls projecting through the sides of said frame with their inner corners beveled so that the axle block can move to the outer end of the guide frame and will be locked in such outer position after it has passed the locking pawls.

4. A bucking automobile including the combination with the front axle and front wheels, of a radial guiding frame mounted in the disk part of each wheel, an axle block fitting and sliding in said frame and the parts arranged so that in one position of the axle block the wheel will be centered, a releasable plunger extending through the side of said guide frame in position to engage the axle block and hold it in centered position, and two yielding pawls mounted in the opposite sides of said guiding frame in position to lock the axle block in its decentered position, the inner corners of said pawls being beveled so that they will be crowded out of the way when the axle block moves toward the decentered position.

5. A bucking automobile including the combination with the front axle and front wheels, of means for mounting the axle in the wheels that is outwardly movable from the center of each wheel for decentering the wheel, means for locking said axle-mounting means in decentered position, means operable by the driver of the automobile for withdrawing said locking means, and spring-held means for locking said axle-mounting means in its decentered position.

6. A bucking automobile including the combination with the front axle and front wheels, of means for mounting the axle in the wheels that is outwardly movable from the center of each wheel for decentering the wheel, means for locking said axle-mounting means in decentered position, means operable by the driver of the automobile while driving the same for withdrawing said locking means in either wheel and both wheels, as desired, and spring-held means for locking said axle-mounting means in its decentered position.

7. A bucking automobile including the combination with the front axle and front wheels, of a radially-extending guide frame in each wheel, an axle block slidable therein so that in the inner position the wheel will be centered, a spring-actuated plunger extending through said frame for holding the axle block in centered position, means for releasing said plunger, means operable by the driver of the automobile while driving the same for actuating said releasing means, and spring-held means for locking said axle-mounting means in its decentered position.

8. A bucking automobile including the combination with the front axle and front wheels, of a radially-extending guide frame in each wheel, an axle block slidable therein so that in the inner position the wheel will be centered, a spring-actuated plunger extending through said guide frame in position to lock the axle block in centered position, a bell crank lever mounted in the wheel with one arm thereof adapted to hold the plunger in locking position and the other arm extends laterally inward beyond the wheel, means operable by the driver of the automobile from the driver's seat for actuating said bell crank lever for releasing the plunger and permitting its withdrawal, and spring-held means for locking said axle-mounting means in its decentered position.

9. A bucking automobile including the combination with the front axle and front wheels, of a radially-extending guide frame in each wheel, an axle block slidable therein so that in the inner position the wheel will be centered, a spring-actuated plunger extending through said guide frame in position to lock the axle block in centered position, a bell crank lever mounted in the wheel with one arm thereof adapted to hold the plunger in locking position and the other arm extends laterally inward beyond the wheel, a spring-held lever mounted on the axle near the front wheel in position when actuated to engage and operate the bell crank lever for permitting the withdrawal of said plunger, and means operable by the driver from the driver's seat for actuating said last-mentioned lever.

10. A bucking automobile including the combination with the front axle and front wheels, each of which is formed of a pair of disks spaced apart, of a radial guide frame mounted in said disks, an axle block mounted slidably in said guide frame, the parts being arranged so that the axle block will be decentered when in its inner position, a casing between the two disks of the wheel at one side of the guide frame, a spring-actuated plunger mounted in said casing and projecting through the guide frame in position to lock and hold the axle block in its centered position, a bell crank lever mounted in said casing with one arm adapted to engage and hold the plunger in its locking position and the other arm projecting inwardly beyond the wheel, means operable by the driver from the driver's seat for actuating said bell crank lever, a casing between the disks of the wheel on opposite sides of said guide frame, and spring-pressed pawls in said last-mentioned frames with their ends projecting through the guide frame into the path of the axle block and beveled on their inner edges so that they will permit the passage between them of the axle block and positioned so that when the axle block reaches its outer limit of movement said pawls will lock it in position.

11. A bucking automobile including a body, a rear axle and rear wheels mounted near the center of gravity of the automobile, whereby the automobile may be up-ended, the body thereof adapted to engage the ground and limit the up-ending movement, a front axle, and front wheels mounted thereon in decentered position, whereby they will cooperate in up-ending the automobile.

12. A bucking automobile including a frame, a body portion, a rear axle and rear wheels mounted near the center of gravity of the automobile, whereby the automobile, may be up-ended, the body thereof adapted to engage the ground and limit the up-ending movement, a front axle, front wheels mounted thereon so as to be decentered, and means operable by the driver from the driver's seat for decentering the same during the travel of the automobile.

13. A bucking automobile having a body, means for up-ending and causing it to rear on its rear wheels and with the rear end of the body engaging the ground, and means for braking either rear wheel and both rear wheels.

14. An amusement device adapted to perform antics such as rearing, bucking and pivoting rapidly in either direction with the manipulation of the control mechanism, consisting of a motor driven vehicle having its rear wheels moved forward to the position of a fulcrum to substantially balance the body when loaded, eccentrically mounted front wheels, separate brakes and brake controls for the respective wheels.

In witness whereof, I have hereunto affixed my signature.

PURK T. GOSSETT.